(12) United States Patent
Barron et al.

(10) Patent No.: US 11,805,227 B2
(45) Date of Patent: Oct. 31, 2023

(54) VIDEO CONFERENCING SYSTEMS WITH MEETING MIGRATION

(71) Applicant: Mersive Technologies, Inc., Denver, CO (US)

(72) Inventors: Brandon Barron, Denver, CO (US);
Brent Gardner, Denver, CO (US);
Christopher Jaynes, Denver, CO (US);
Justin McBride, Denver, CO (US);
Ryan Lee, Highlands Ranch, CO (US)

(73) Assignee: Mersive Technologies, Inc., Denver, CO (US)

( * ) Notice: Subject to any disclaimer, the term of this patent is extended or adjusted under 35 U.S.C. 154(b) by 61 days.

(21) Appl. No.: 17/466,936

(22) Filed: Sep. 3, 2021

(65) Prior Publication Data
US 2022/0078376 A1    Mar. 10, 2022

Related U.S. Application Data

(60) Provisional application No. 63/074,965, filed on Sep. 4, 2020.

(51) Int. Cl.
| | |
|---|---|
| H04N 7/15 | (2006.01) |
| H04L 65/1069 | (2022.01) |
| H04L 65/1093 | (2022.01) |
| H04L 65/1096 | (2022.01) |
| G06F 3/0482 | (2013.01) |

(52) U.S. Cl.
CPC ......... *H04N 7/155* (2013.01); *H04L 65/1069* (2013.01); *H04L 65/1093* (2013.01); *H04L 65/1096* (2013.01); *H04N 7/15* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 8,881,029 | B2* | 11/2014 | Thapa | H04L 65/1089 715/756 |
| 2011/0022968 | A1* | 1/2011 | Conner | H04N 7/15 715/753 |
| 2012/0163577 | A1* | 6/2012 | Buford | H04L 12/1822 379/202.01 |
| 2013/0298040 | A1* | 11/2013 | Jones | H04M 3/563 715/753 |
| 2016/0285926 | A1* | 9/2016 | Sall | H04L 65/1093 |
| 2019/0130366 | A1* | 5/2019 | Pell | G06F 16/24 |

* cited by examiner

*Primary Examiner* — Quoc D Tran
(74) *Attorney, Agent, or Firm* — Cozen O'Connor

(57) ABSTRACT

A system and method for a video conferencing system with meeting migration allows a client device to host a video conference meeting while connected to a video conferencing system in a first conference room. At any point during the meeting, the video conference may be paused and the current state of the video conference in a first conference room may be saved. The video conference meeting may then be migrated to a second conference room without having to restart the video conference. Client devices that have connected to the video conferencing system as well as client devices that have joined the video conference, the contents of the shared display, and other elements of the video conference are saved and restarted in the second conference room.

17 Claims, 4 Drawing Sheets

VIDEO CONFERENCING SYSTEMS WITH MEETING MIGRATION

CROSS REFERENCE TO RELATED APPLICATIONS

This application claims priority to Provisional Patent Application 63/074,965 filed Aug. 4, 2020 and titled "Video Conferencing System with Meeting Migration," the entire contents of which is incorporated by reference.

BACKGROUND

Digital infrastructure is embedded in the personal and professional lives of most individuals and serves to connect them for communication and sharing in a multitude of ways. Digital infrastructure may include both devices such as laptops, printers, and servers, as well as the networks to which they are connected. Communication and sharing may include audio, video, images, documents, or any type of content that may be created or represented on a digital device. Users communicating with their devices may be located in the same room or in far-flung geographic locations.

In office settings, part of the digital infrastructure may include one or more physical conference rooms configured with a video conferencing system. These systems allow users to hold a video conference with participants in the physical conference room itself and/or in remote locations. Users in the physical conference room may share and manipulate shared content from their client devices using a shared display of the video conferencing system.

A physical office space occupied by a business or organization may include more than one conference room, each of which may be outfitted with a video conferencing system. In some respects, an individual's office may also be considered a physical conference room. Video conferencing systems in conference rooms are typically coupled to the local network but may also be connected to the Internet directly.

Physical conference rooms may be scheduled using a calendar service. They may also be used in an ad hoc fashion when one or more employees enters the physical conference room and initiates a video conference. For various reasons, employees may find that they need to leave a physical conference room before a meeting is over. For example, a scheduled meeting may run late and conflict with a later scheduled meeting, or users may start an ad hoc meeting in a physical conference room without realizing that a meeting already is scheduled there for the same time. Typically, moving to a new physical conference room is time and labor intensive, as doing so requires ending the video conference for all participants in one location, moving to another physical conference room, then restarting the video conference and requiring all the participants to rejoin.

SUMMARY OF THE EMBODIMENTS

In embodiments, a video conferencing system and method of meeting migration allows users making use of a video conferencing system in a first physical conference room to host a video conference to save a list of client devices that have joined the video conference and content of the shared display in the first physical conference room, move to a second physical conference room, then restart the video conference by restoring connections from client devices to the video conferencing system in the second physical conference room and restoring displayed content on a shared display.

DETAILED DESCRIPTION OF THE EMBODIMENTS

Figure 1A:
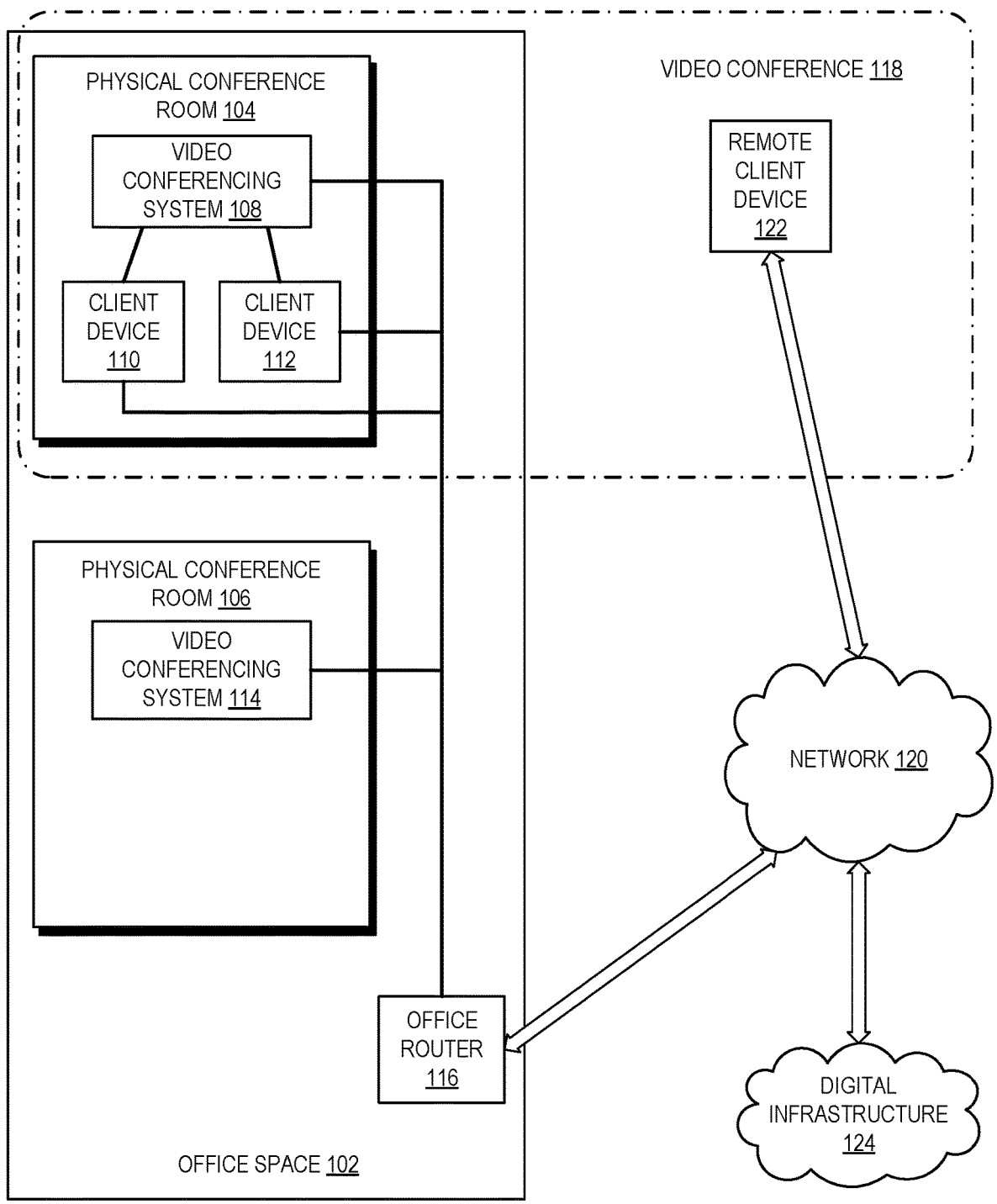
FIGS. 1A and 1B are diagrams illustrating meeting migration in a video conferencing system, in embodiments.

An office space occupied by a business or organization typically includes individual working spaces and one or more group working spaces such as physical conference rooms. Embodiments described herein are not limited to a "room" with walls and a door but encompass any location where a video conferencing system has been installed for shared use by employees of a business or members of an organization. Further, a room may also be understood as an individual office. Likewise, embodiments described herein are not limited to employees of a business but may also be used by individuals associated with any type of organization or enterprise that provides a digital infrastructure to the individuals.

The digital infrastructure of a business includes computing devices and a communications network connecting the computing devices. The computing devices may include physical devices such as printers, routers and servers for maintaining calendars, software licenses, and other information necessary for the functioning of the business. In embodiments, cloud storage may be part of the digital infrastructure. The communications network may be local to an office space such as a wide area or local area network (WAN or LAN). Computing devices may be connected to the Internet through a local network or directly.

Individual client devices such as laptops or mobile phones assigned to employees of the business may also be considered part of the digital infrastructure and may be connected to the local network, a cellular network, or directly to the Internet, as may other digital infrastructure such printers, servers and other computing devices. Internet of Things (IoT) devices, such as access pads and lights, may be connected to the network, for example. Client devices as described herein include any computing device having at least a display, user entry mechanism and network connectivity, such as a laptop, mobile device or a tablet, for example.

The digital infrastructure maintained by a business may be physically located in one office space. Further, a business may have multiple office spaces that are geographically distant from each other. The scope of the digital infrastructure may be logically understood as encompassing computing devices and networks in all office spaces occupied by the business. Office spaces may also be understood as a home or other location where an employee is using part of the digital infrastructure of the business.

Another part of the digital infrastructure of an office space may include video conferencing systems installed in one or more physical conference rooms. A video conferencing system may include several components: one or more shared displays mounted so that they are visible to everyone in the room; an audio system such as a standalone microphone, speakers or telephone and a room camera, which typically has a wider field of view and is deployed in the room in a fixed location to support all users in the room who want to participate in the meeting. A video conferencing system also includes a (i) host device coupled with other room components for managing the room components, connecting to a network, and providing ports for users to connect a client device to the video conferencing system; and (ii) a codec unit that is responsible for call control (via SIP), audio, and video send (RSTP). In embodiments, the codec may be included with the host device.

During a video conference using a video conferencing system, client devices may connect to the video conferencing system using client software to share the content of digital files on their client device with other participants on the shared display. The host device provides for this type of sharing by making ports available to users to connect their personal device to the host device. These ports may use a physical connection such as a USB cable, HDMI cable, Lightning cable, or the like, or a wireless communication protocol, such as cellular (4G, 5G, LTE, Bluetooth®, Bluetooth Low Energy®, Wi-Fi®, etc.) Host software in the host device and client software in the client devices allows users to interact with their own content or other user's content on the one or more shared displays in the physical conference room.

In addition, one of the users in the physical conference room may choose to host a video conference with remote users so that the content on the shared display may be seen by the remote users who are not in the physical conference room. Video conferencing applications such as WebEx® or Zoom® allow client devices to host a video conference that may be joined by remote users.

When more than one user with a client device is using a video conferencing system in a physical conference room to share content, several client devices may add and manipulate content on a shared display over a period of time. In addition, initiating a video conference includes time to launch a video conferencing application on a hosting client device as well as any other remote client devices that have joined the video conference. These investments of time and effort can be understood as a "state" of the video conference and may be lost if video conference must be ended so participants can move to a different physical conference room. More specifically, the state of a video conference in a physical video conference room includes at least a list of client devices that have shared content to the shared display using client software, the shared content and a list of client devices who have joined a video conference using a video conferencing application. In embodiments, other information may be included in the state of a video conference such as time and location, for example.

In embodiments, a video conferencing system with meeting migration allows a client device hosting a video conference in a physical conference room to save the current state of the video conference as it exists in a first physical conference room, then migrate it to a second physical conference room without having to restart the video conference. The state of the video conference for both in-room and remote client devices is saved and restarted in the second physical conference room.

Figure 1B:
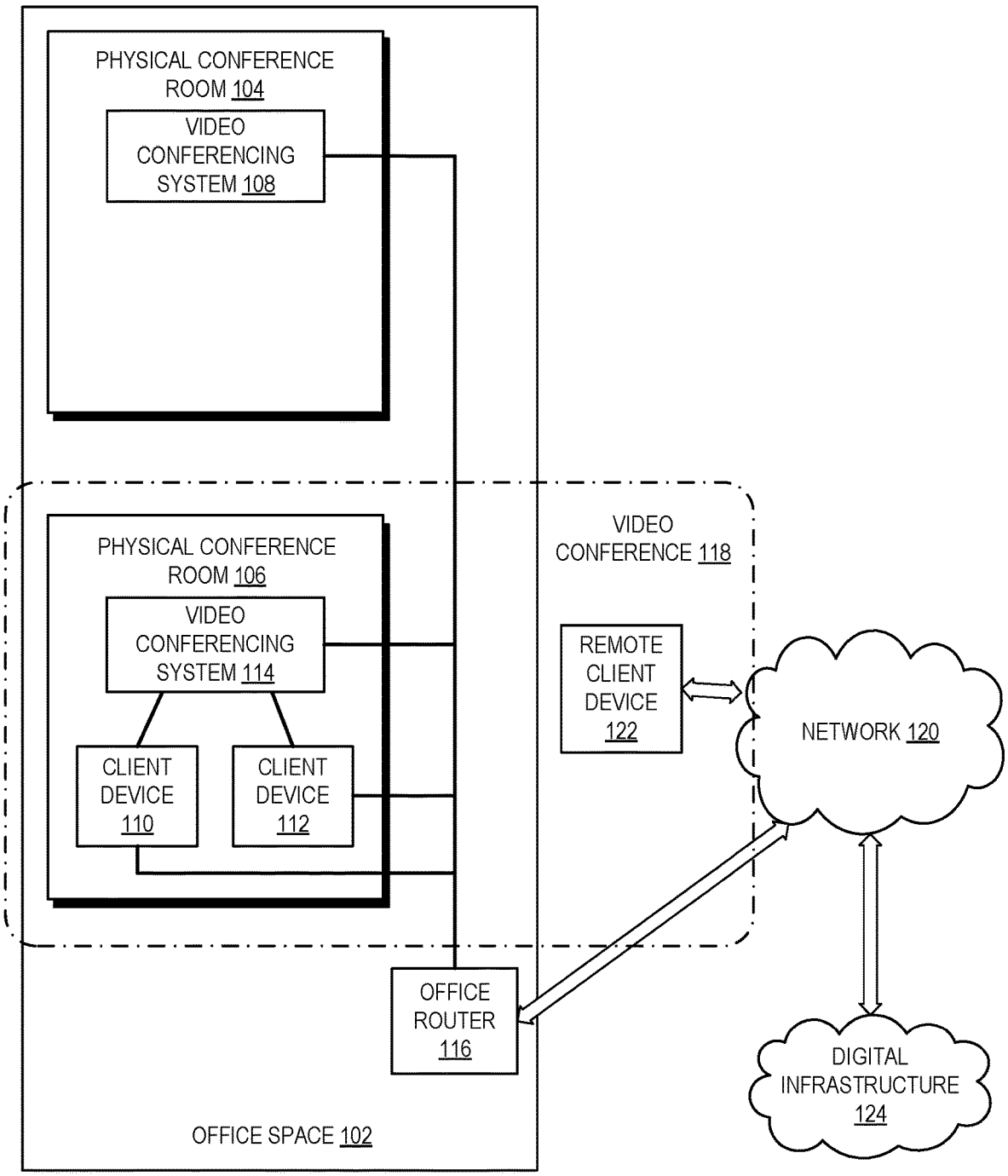

FIG. 1A is a diagram of a representative office space 102 and digital infrastructure for conducting video conferences. FIG. 1B is a diagram of the office space after a meeting migration. FIGS. 1A and 1B are best viewed together in the following discussion.

Office space 102 includes a physical conference room 104 and physical conference room 106. Although two conference rooms are shown in FIG. 1A, an office space may include any number of conference rooms or other areas where participants in a video conference can gather. Physical conference room 104 includes a video conferencing system 108 while physical conference room 106 includes video conferencing system 114. Both video conferencing system 108 and video conferencing system 114 are connected to a local network in office space 102 that is maintained by office router 116. Office router 116 is connected to network a 120, for example, the Internet. In embodiments, video conferencing systems 108 and 114 may be connected directly to network 120. Various representative components of video conferencing systems 108, 114 and client devices 110, 112 are further described in connection with FIG. 2 below.

FIG. 1A shows client devices 110 and 112 in physical conference room 104 and connected to video conferencing system 108 to share digital content on a shared display of video conferencing system 108. Client devices 110 and 112 may also be connected to office router 116 as well as to network 120 (connections not shown). Although two client devices 110 and 112 are shown in FIG. 1A, any number of client devices may be connected to video conferencing system 108 in physical conference room 104. Either of client devices 110 or 112 may also host a video conference 118 using video conferencing application such as WebEx or Zoom. A remote client device 122 may also join video conference 118 over network 120. Lines shown connecting various components of FIGS. 1A and 1B represent a connection that may be wired or wireless. In embodiments, network 120 may also include a cellular network. In FIG. 1A, physical conference room 106 is not being used for a video conference.

Digital infrastructure 124 represents physical devices such as servers or cloud storage that maintain calendars, websites, lists of devices, software licenses and any other information necessary for the functioning of the business. It also represents other digital devices such as printers, computers, postage meters, access pads and lights, for example. Any of the devices of digital infrastructure 124 may also or alternatively be connected to office router 116.

In embodiments, a user hosting a meeting in physical conference room 104 may interact with client device 110 (or client device 112) to host video conference 118 using a video conferencing application. The discussion herein is presented in terms of client device 110, but any client device may host a video conference meeting using video conferencing system 108. To host a meeting, client software on client device 110 is used to connect with a host device of video conferencing system 108. Client device 110 is connected, either wired or wirelessly, to video conferencing system 108 so that content can be shared with a shared display in physical conference room 104 as a video stream.

The user of client device 110 then launches a video conferencing application on client device 110 to initiate video conference 118 using the shared display and other components of video conferencing system 108. Remote client device 122 may also launch a video conferencing application and join video conference 118. Although one remote client device 122 is shown, any number of remote devices may join video conference 118 as determined by the capabilities of the video conferencing application. Client device 112 may also use client software to connect to video conferencing system 108.

In embodiments, a circumstance may require the users of client devices 110 and 112 to leave physical conference room 104 before they are ready to end their meeting. This circumstance may occur when video conference 118 extends past an end time and conflicts with another video conference scheduled for physical conference room 104, for example. Alternatively, physical conference room 104 may have dimensions or peripherals that are required for a new video conference but are not necessary for video conference 118. Either of these circumstances or others may require the users of client devices 110 and 112 to move to a different physical conference room.

A request to migrate video conference 118 to a different physical conference room may be received by client device 110 or 112. A request to migrate may be triggered by a user interaction with client software or by notification from a calendar service. As will be explained in more detail below, client devices 110 and 112 may disconnect from video conferencing system 108, move to physical conference room 106 and connect to video conferencing system 114 without ending video conference 118. FIG. 1B shows that video conference 118 has migrated to physical conference room 106. Client devices 110 and 112 have connected to video conferencing system 114. Since the state of video conference is saved when the meeting is migrated, the contents of the shared display of video conferencing system 108 are restored on the shared display of video conferencing system 114 and remote user 122 is still joined to the video conference 118 started on client device 110.

Figure 2:
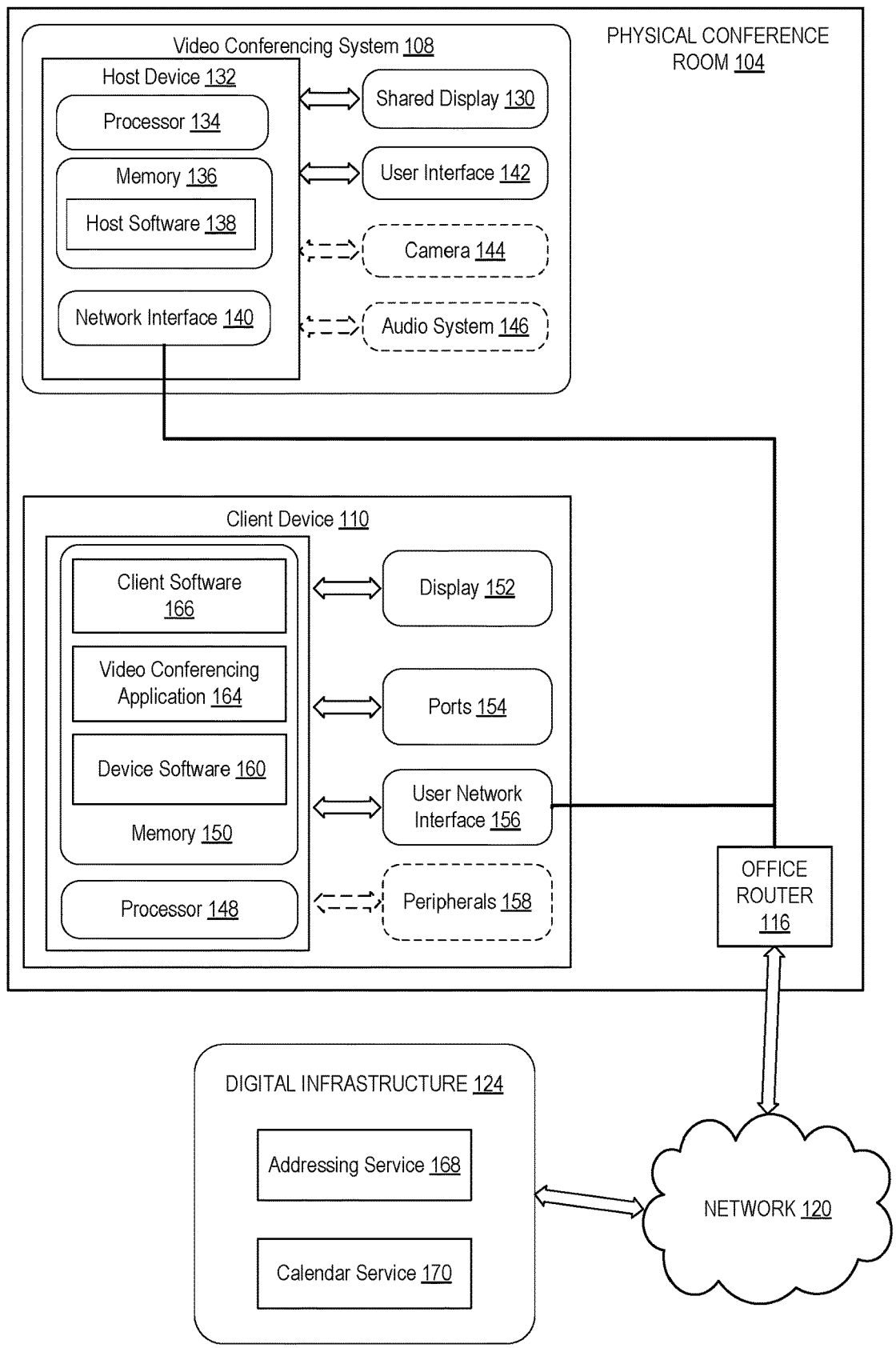
FIG. 2 is a diagram illustrating exemplary components of FIGS. 1A and 1B, in embodiments.

FIG. 2 illustrates exemplary components of FIGS. 1A and 1B. Physical conference room 104 and video conferencing system 108 are shown in FIG. 2, but the discussion herein applies equally to physical conference room 106. A video conferencing system 108 includes shared display 130 controlled by host device 132. Shared display 130 includes one or more displays mounted and sized such that they are visible to everyone in physical conference room 104.

Host device 132 includes at least one processor 134 and memory 136, which stores instructions which, when executed by processor 134 cause host device to perform functions of video conferencing system 108. The software components shown in FIG. 2 are for purposes of illustrating embodiments herein. More or fewer software components may be provided in memory 136 as needed. Host software 138 includes instructions for operating the components of video conferencing system 108, as well as interacting with client software 166 in client device 110 to allow client device 110 to access shared display 130 and other components of video conferencing system 108.

Host device 132 also includes a network interface 140 for connecting to office router 116 and/or to network 120. Network 120 represents any wired or wireless network that facilitates communication between electronic devices, such as Wi-Fi, Bluetooth, WAN, LAN, radio frequency or cellular, for example. In embodiments, network interface 140 may be connected directly to network 120.

A user interface 142 such as a keyboard or tablet device, may be provided with video conferencing system 108 to allow a user to interact with host device 132 to determine what is shown on shared display 130. User interface 142 is not the only way to communicate with host device 132. Host software 138 may interact with client devices over network interface 140 so that client device 110 acting as a host provides video conferencing functions such as call set-up and control. Client device 110 is bridged to host device 132 and may also control shared display 130 and other components of video conferencing system 108.

In embodiments, video conferencing system 108 may also include a camera 144 and an audio system 146, such as one or more microphones and speakers. Other peripheral devices may also be included in video conferencing system 108 depending on the preferences of the business and/or users.

Client device 110 may be connected with video conferencing system 108 in a variety of ways. Client device 110 may be connected over a LAN or WAN managed by office router 116, over network 120, or by a direct connection to host device 132 (not shown). For clarity of illustration, only client device 110 is shown in FIG. 2, but any number of client devices may be used with video conferencing system 108. Client device 110 may be a laptop device, mobile device or any digital device capable of connecting to a communication network.

Client device 110 includes at least processor 148 and memory 150 for storing data and instructions for execution by processor 148. Client device 110 also includes a display 152 and one or more ports 154, such as USB, charging ports or an external display port. In embodiments, client device 110 may include one or more peripherals 158. A user laptop device, for example, may include keyboard, camera, speakers, etc., that may be connected to processor 148 and memory 150 through one or more of ports 154. A user's mobile device may include similar peripherals incorporated within the housing of the user's mobile device or as external devices.

Memory 150 of client device 110 stores various software components as described herein. Software components shown in FIG. 2 are for purposes of illustrating embodiments herein. More or fewer software components may be provided in memory 150 as needed. Device software 160 includes instructions for operating the components of client device 110. Memory 150 also stores client software 166, which is used to connect to and interact with host device 132 of video conferencing system 108. Video conferencing application 164 represents software for participating in a video conference with other participants, for example, WebEx or Zoom.

Client device 110 connects to office router 116 or network 120 by means of user network interface 156, which may be a wireless transceiver with an antenna or other device that may exchange information with a network. User network interface 156 may include the capability to connect using one or more different protocols or with a wired connection, in embodiments. More than one interface and protocol may be provided in user network interface 156.

Digital infrastructure 124 represents other components that form part of the hardware and software that is maintained or accessed by a business. Various components of digital infrastructure 124 may be connected to and accessible through network 120. They may also be connected to office router 116 or incorporated within host device 132 or client device 110. Digital infrastructure 124 may be provided by processing hardware such as a server, or in cloud storage.

Digital infrastructure 124 includes addressing service 168, which may manage a list of network addresses of devices associated with or accessible by a business. A network protocol such as DNS (Domain Name Server) may be used by devices used to resolve a logical network address into a unique IP (Internet Protocol) address of addressing service 168.

In embodiments, addressing service 126 stores a list of host and client devices that send regular update messages including an IP address and other metadata, which varies by the device. For example, host device 132 may send an update message including the IP address of the host device, ports to be used to communicate with the device, a humanreadable name such as "Conference Room 1," the number of users connected to the device, and a current screen key. Client device 110 may send a message including a device ID, a current IP address, etc.

Calendar service 170 creates and maintains calendar entries for client devices that are associated with a user of the client device. Calendar entries may also be created and maintained for physical conference rooms, which have their own calendar. In addition to date, time, and participants, calendar entries may also include a location such as a physical conference room, video conferencing application login information, or both. Calendar service 170 may be provided internally or by a cloud-based calendar service such as Microsoft 365®, for example.

Figure 3:
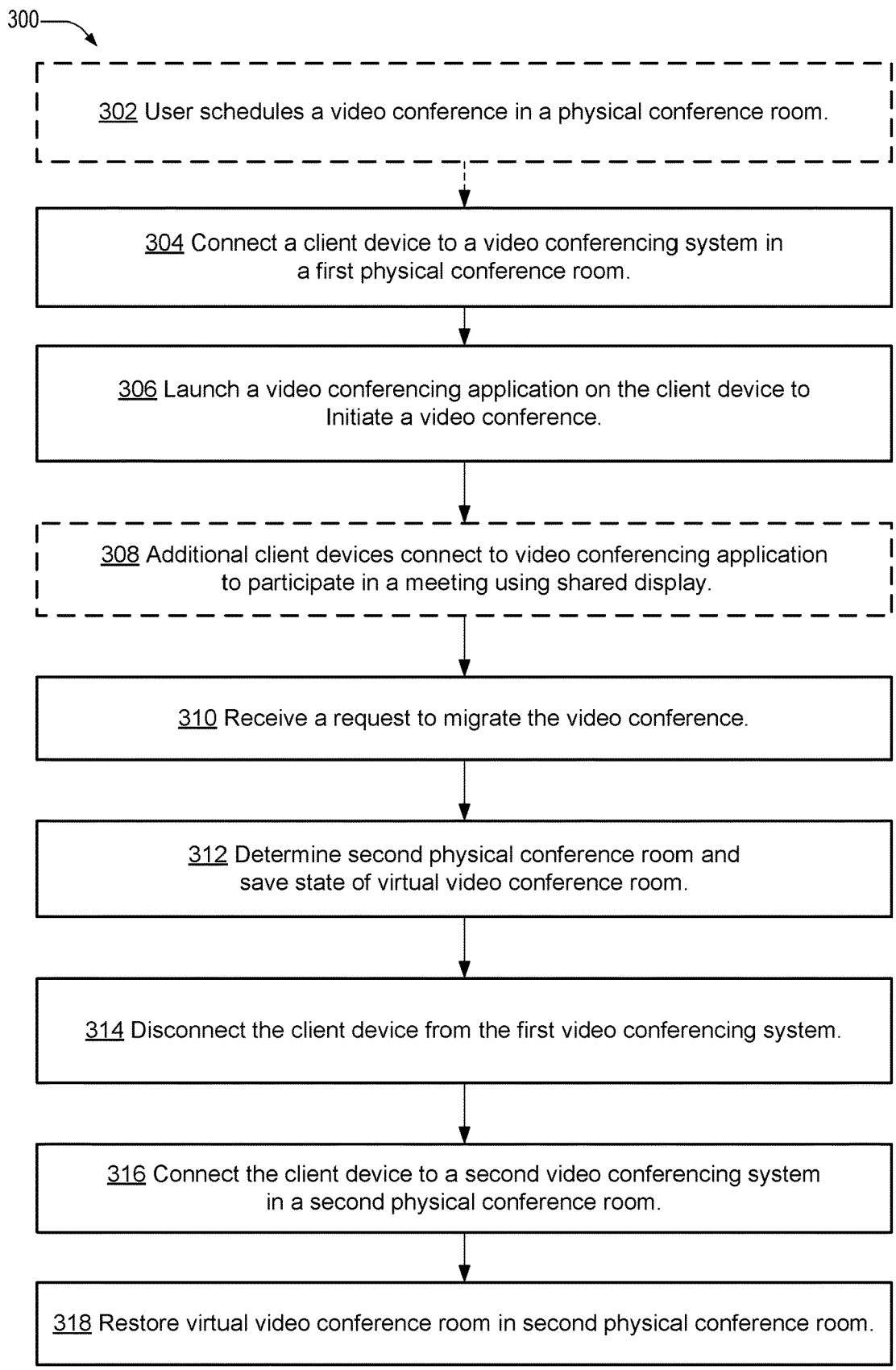
FIG. 3 is a flowchart of a method of meeting migration in a video conferencing system.

FIG. 3 is a flowchart of a method 300 of meeting migration between video conferencing systems. In embodiments, method 300 includes steps 304, 306, and 310-318. In further embodiments, method 300 includes at least one of steps 302 and 308. In embodiments, method 300 is implemented by processor 134 executing computer-readable instructions of software 138.

In step 302, a user schedules a video conference in a physical conference room. In an example of step 302, a user of client device 110 schedules a meeting using calendar service 170 and reserves physical conference room 104, for example. A user may also enter the physical conference room to start an ad hoc meeting without advance scheduling. While specific components are referenced in the description herein, any client device or video conferencing system maintained by a business may be used in the following steps.

In step 304, a client device is connected to a first video conferencing system in a first physical conference room. In an example of step 304, the user opens client software 166 on client device 110, which communicates with addressing service 168 to connect with host device. Alternatively, client software 166 may communicate with host device 132. Client software 166 may also access addressing service 168 and calendar service 170 to present a list of available conference rooms to a user for selection. In further embodiments, client software 166 may present an input field for a user to enter a screen key displayed on shared display 130. The user may connect with a video conferencing system by connecting a cable between host device 132 and client device 110. Client device 110 is connected, either wired or wirelessly, to host device 132 so that the content from shared display 130, peripherals, and other users are shared with client device 110 as a video stream.

In step 306, a video conferencing application is launched on client device to host a video conference. In an example of step 306, video conferencing application 164 on first client device 110 may be launched in one of a variety of ways. Client software 166 may communicate with calendar service 170 to identify a meeting scheduled for client device 110 and/or physical conference room 104, parse the meeting entry, and launch video conferencing application 164 as identified in the meeting notice. Alternatively, client software 166 may provide an option for a user to select a preferred video conferencing application 164. Launching video conferencing application 164 initiates video conference 118 in physical conference room 104. In embodiments, a user of client device 110 selects shared display 130 to share in video conference 118 using video conferencing application 164.

In step 308, one or more additional users may join the meeting. In an example of step 308, one or more users may enter physical conference room 104 and connect to host device 132 as described above to work collaboratively using shared display 130. Client devices 110 connected to host device 132 may perform a variety of tasks when connected to host device 132. For example, client device 110 may publish the live output of an application running on client device 110 to shared display 130, select any image appearing on shared display 130, manipulate the selected image using scale and repositioning tools, and transmit streams of video or other media from client device 110 to shared display 130. Remote client devices 122 may also join a meeting in video conference 118 using a video conferencing application on the remote client device.

In embodiments, step 308 represents any activity that might be performed during a video conference, the details of which represent a state of an ongoing video conference in terms of participants, the content they have caused to be shown on shared display 130, and any other metadata required to restore the video conference in a different physical conference room.

In step 310, a request to migrate a video conference is received. In an example of step 310, a circumstance arises that requires participants in video conference 118 to leave physical conference room 104 before they are ready to be finished with their meeting. A user of client device 110 (or any client device that launched the video conferencing application in step 306), inputs a request to migrate video conference 118. In some embodiments, client software 166 may identify a meeting end time in a meeting notice and request an input from a user indicating that a meeting should be extended or that another physical conference room should be selected.

In step 312, a second physical conference room is determined, and a state of the video conference is saved. In an example of step 312, client software 166 requests a list of available physical conference rooms from addressing service 168 and displays them on client device 110. Upon receiving a selection input indicating a second physical conference room 106, client software 166 saves the current state of video conference 118 including a list of participant including both those connected to video conferencing system 108 and those joined to video conference 118 using a video conferencing application, the content client devices 110 and 112 have caused to be shown on shared display 130 and other metadata. In some embodiments, a calendar entry for second physical conference room 106 is updated with a reservation for a meeting. In further embodiments, a communication such as an email or text message identifying the second physical conference room 106 is sent to other client devices that connected to physical conference room 104, and/or to other users who were listed on the original meeting invitation.

In step 314, client device is disconnected from host device of video conferencing system. In an example of step 312, client software 166 of client device 110 terminates a connection with host device 132 of video conferencing system 108. In embodiments, a user may unplug a cable between host device 132 and client device 110. Further, disconnecting may involve entering one or more commands to client software 166. Other client devices in the conference room also disconnect from host device 132. While client device 110 is disconnected from host device 132, video conferencing application 164 is not stopped. Rather, video conferencing application 164 is maintained such that any remote client devices 122 are still joined to video conference 118.

In step 316, client devices are connected to a video conferencing system in the second physical conference room. In an example of step 316, client device 110 is connected, either wired or wirelessly, to host device 132 in video conferencing system 114 in second physical conference room 106 as explained above for step 302. Client device 112 and other client devices participating in the video conference may also connect to video conferencing system 114.

In step 318, the state of video conference is restored in the second physical conference room. In an example of step 318, the content shared to shared display 130 by various client devices in physical conference room 104 is shown on shared display 130 in second physical conference room 106 when the client device providing the content connects to host device 132 in second physical conference room 106. If a client device has not connected to host device 132, a place holder image may be shown on shared display 130.

In any of the embodiments herein, client devices may connect to a host device as taught by Application Number PCT/US21/49175 filed Sep. 4, 2021 titled "Touchless Control of Video Conferencing System," incorporated by reference. A device pool may also be used to register client device 110 for the purposes of authentication and control and may be maintained using one or more of application software of client device 110, addressing service 168, and/or another server accessible via network 120.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated: (a) the adjective "exemplary" means serving as an example, instance, or illustration, and (b) the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method for migrating a video conference between physical conference rooms each having a video conferencing system controlled by a host device, the method comprising:
   connecting a first client device to a first video conferencing system in a first physical conference room using client software;
   launching a video conferencing application to initiate a video conference on the first client device;
   receiving a request to migrate the video conference to a second physical conference room comprising:
      sending a request for a list of available physical conference rooms to an addressing service over a communications network; and
      displaying the list of available physical conference rooms;
   determining the second physical conference room and saving a state of the video conference;
   disconnecting the first client device from the first video conferencing system without ending the video conferencing application;
   connecting the first client device to a second video conferencing system in the second physical conference room to; and
   restoring the video conference in the second physical conference room.

2. The method of claim 1, wherein connecting the first client device to the first video conferencing system comprises:
   launching the client software on the first client device;
   coupling the first client device to the host device; and
   sharing content from the first client device with a shared display coupled to the host device as a video stream.

3. The method of claim 1, further comprising, when a second client device is connected to the video conferencing system in the first video conference room, a method of:
   disconnecting the second client device from the first video conferencing system without ending the video conferencing application running on the second client device; and
   connecting the second client device to the second video conferencing system in the second physical conference room.

4. The method of claim 1, wherein determining a second physical conference room further comprises:
   receiving an input to select a second physical conference room from the list of available physical conference rooms; and
   saving a state of the video conference wherein the state comprises a list of participants in the video conference, content shared on shared display, and other metadata.

5. The method of claim 1, wherein saving a state further comprises sending an update to the plurality of participants identifying the second physical conference room.

6. The method of claim 5, wherein the update is an email message.

7. The method of claim 1, wherein the video conference is associated with a meeting entry on a calendar, and saving a state further comprises updating the meeting entry to identify the second physical conference room.

8. The method of claim 1, further comprising a remote client device joining the video conference using a video conferencing application launched on the remote client device.

9. A digital infrastructure for migrating a video conference between physical conference rooms without ending the video conference, comprising:
   a first video conferencing system installed in a first physical conference room, said first video conferencing system comprising a first shared display controlled by a first host device;
   a second video conferencing system installed in a second physical conference room, said second video conferencing system comprising a second shared display controlled by a second host device;
   a plurality of client devices each comprising a processor, a network interface, a memory and machine-readable instructions stored in the memory for execution by the processor;
   an addressing service maintaining a list of current IP addresses of host devices and each of the plurality client devices;
   wherein, for the first client device of the plurality of client devices, the machine-readable instructions, stored in the memory, that, when executed by the processor, control the processor to:
   connect the first client device to the first video conferencing system in the first physical conference room using client software;
   launch a video conferencing application to initiate a video conference on the first client device;
   receive a request to migrate the video conference to a second physical conference room;
   determine the second physical conference room and save a state of the video conference;

disconnect the first client device from the first video conferencing system without ending the video conferencing application;

connect the first client device to a second video conferencing system in the second physical conference room to; and restore the video conference in the second physical conference room.

10. The digital infrastructure of claim 9, further comprising instructions, when executed by the processor to connect the first client device the first video conferencing system further control the processor to:

launch client software on the first client device;

couple the first client device to the first host device; and receive a content of the shared display from the first host device as a video stream.

11. The digital infrastructure of claim 9, further comprising a second client device of the plurality of client devices connected to the first video conferencing system, and the processor in the second client device executes instructions to:

disconnect the second client device from the first video conferencing system in the first physical conference room; and connect the second client device to the second video conferencing system in the second physical conference room.

12. The digital infrastructure of claim 9, further comprising instructions, when executed by the processor in the first client device to receive a request to migrate the video conference further control the processor to:

receive an input to pause the video conference and send a request for a list of available physical conference rooms to an addressing service over a communications network; and display the list of available physical conference rooms.

13. The digital infrastructure of claim 12, further comprising instructions, when executed by the processor in the first client device, control the processor to determine a second physical conference room further control the processor to:

receive an input to select a second physical conference room; and save a state of the video conference wherein the state comprises a list of participants in the video conference, content shared on shared display, and other metadata.

14. The digital infrastructure of claim 12, wherein saving a state comprises sending an update to participants identifying the second physical conference room.

15. The digital infrastructure of claim 14, wherein the update is an email message.

16. The digital infrastructure of claim 12, wherein the video conference is associated with a meeting entry on a calendar, and saving a state comprises updating the meeting entry to identify the second physical conference room.

17. The digital infrastructure of claim 9, further comprises a remote client device joined to the video conference launched on the first client device.

* * * * *